United States Patent [19]
Shao

[11] Patent Number: 5,885,199
[45] Date of Patent: Mar. 23, 1999

[54] COMPACT MACHINING CENTER FOR MULTIFUNCTION

[76] Inventor: Wenyuan Shao, P.O. Box 1130, Hefei, Anhui, 230031, China

[21] Appl. No.: 875,867
[22] PCT Filed: Feb. 6, 1996
[86] PCT No.: PCT/CN96/00011
§ 371 Date: Aug. 5, 1997
§ 102(e) Date: Aug. 5, 1997
[87] PCT Pub. No.: WO96/24456
PCT Pub. Date: Aug. 15, 1996
[51] Int. Cl.$^6$ .............................. B23Q 3/155; B23B 29/24
[52] U.S. Cl. .................................. 483/19; 29/27 C; 29/39; 82/159; 483/18; 483/31; 483/66
[58] Field of Search ................................ 29/27 R, 39, 40, 29/27 C, 27 B; 483/32, 31, 33, 17, 18, 19, 24, 66, 7, 14; 408/35; 82/129, 159, 120, 158

[56] References Cited

U.S. PATENT DOCUMENTS

| | | | |
|---|---|---|---|
| 3,710,466 | 1/1973 | Williamson et al. | 29/27 R |
| 4,601,094 | 7/1986 | Myers | 483/7 |
| 4,704,773 | 11/1987 | Quinar et al. | 29/39 X |
| 4,949,443 | 8/1990 | Saruwatari et al. | 29/27 C |
| 5,222,283 | 6/1993 | Lashet | 182/158 X |
| 5,282,300 | 2/1994 | Giray et al. | 82/120 |
| 5,439,431 | 8/1995 | Hessbrüggen et al. | 483/14 |
| 5,490,307 | 2/1996 | Link | 29/27 C |

FOREIGN PATENT DOCUMENTS

| | | | |
|---|---|---|---|
| 0 259 637 | 3/1988 | European Pat. Off. | |
| 3702424 | 8/1988 | Germany | 29/27 C |
| 18 3305 | 7/1989 | Japan | 483/31 |
| 40 6 226510 | 8/1994 | Japan | 29/27 C |
| 2 212 753 | 2/1989 | United Kingdom . | |
| 2215251 | 9/1989 | United Kingdom | 29/27 C |

Primary Examiner—William R. Briggs
Attorney, Agent, or Firm—Merchant, Gould, Smith, Edell, Welter & Schmidt

[57] ABSTRACT

A multifunction, compact machining center has a work spindle which can rotate at high speed, or controlled by a C axis servo driver, and a frame-shaped tool magazine, which is composed of a standing part and a rotatable part. Arranged on the standing part are enough internal and external turning tools to complete all turning processes on one workpiece. Driven tools are held on the rotatable part to do drilling, boring, milling, gear hobbing, grinding, lapping etc. on the same workpiece at arbitrary angles. Additionally, work units for quenching, laser machining, gear shaping, bevel gear cutting, measuring, loading and unloading can also be employed on the tool magazine. By means of movements of the tool magazine relative to the work spindle in the plane perpendicular to the Z axis, each cutting tool or working unit can be put into the working area of the workpiece sequentially so as to complete all machining, measuring, loading and unloading. This invention replaces several machining centers or an FMS, and advantageously, this compact machining center avoids accuracy loss and waste of time caused by repeated clamping.

16 Claims, 9 Drawing Sheets

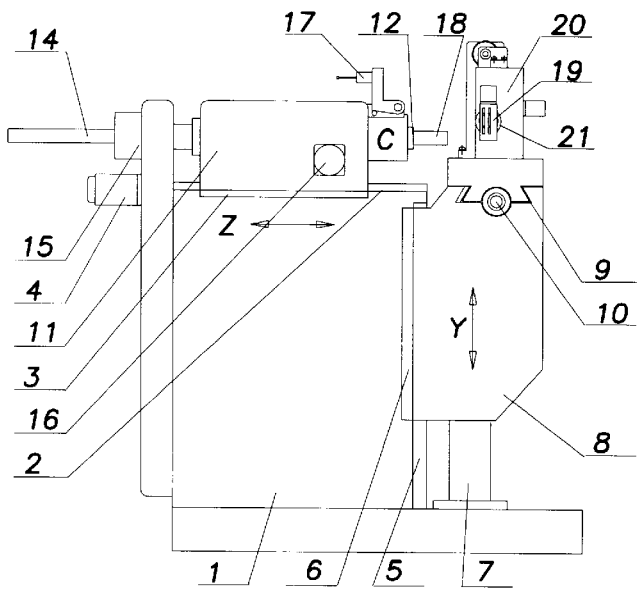
FIG. 1A
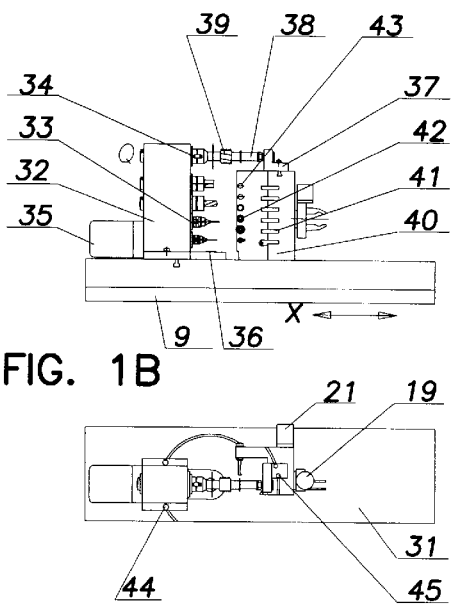
FIG. 1B
FIG. 1C
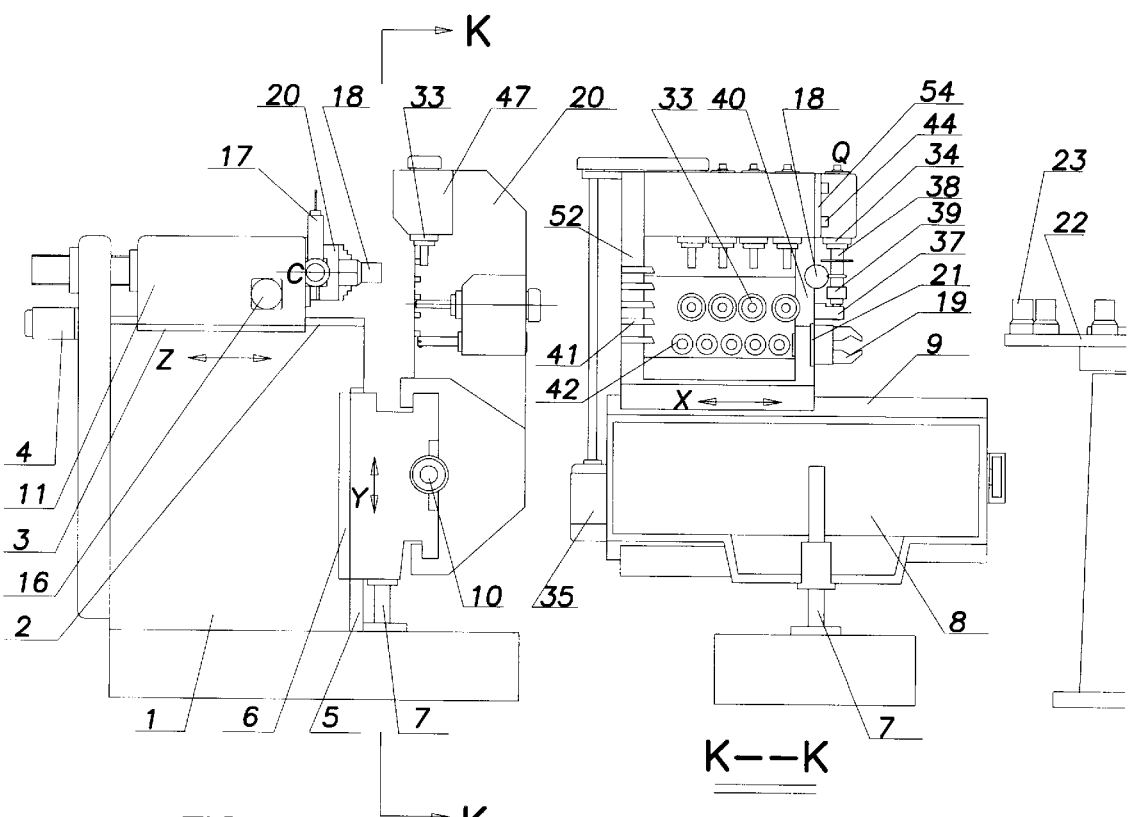
FIG. 2A
FIG. 2B

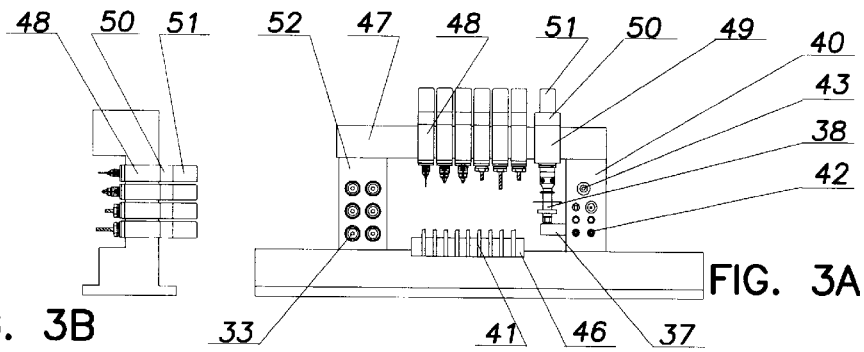
FIG. 3B   FIG. 3A
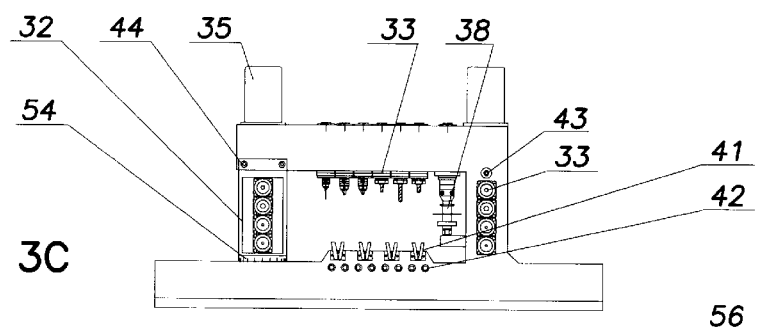
FIG. 3C
FIG. 3D
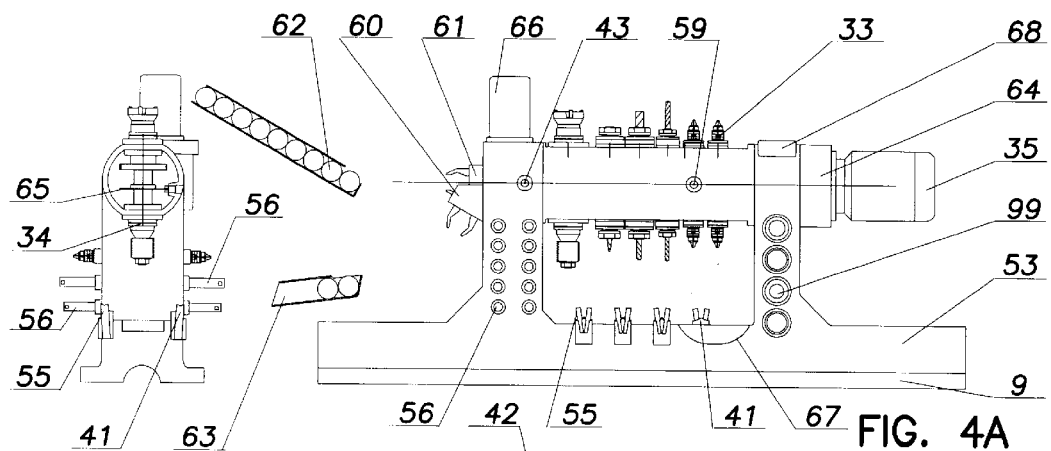
FIG. 4A
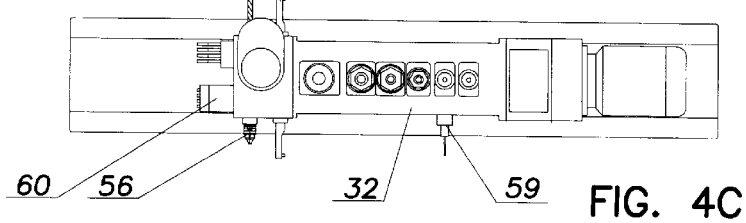
FIG. 4B   FIG. 4C

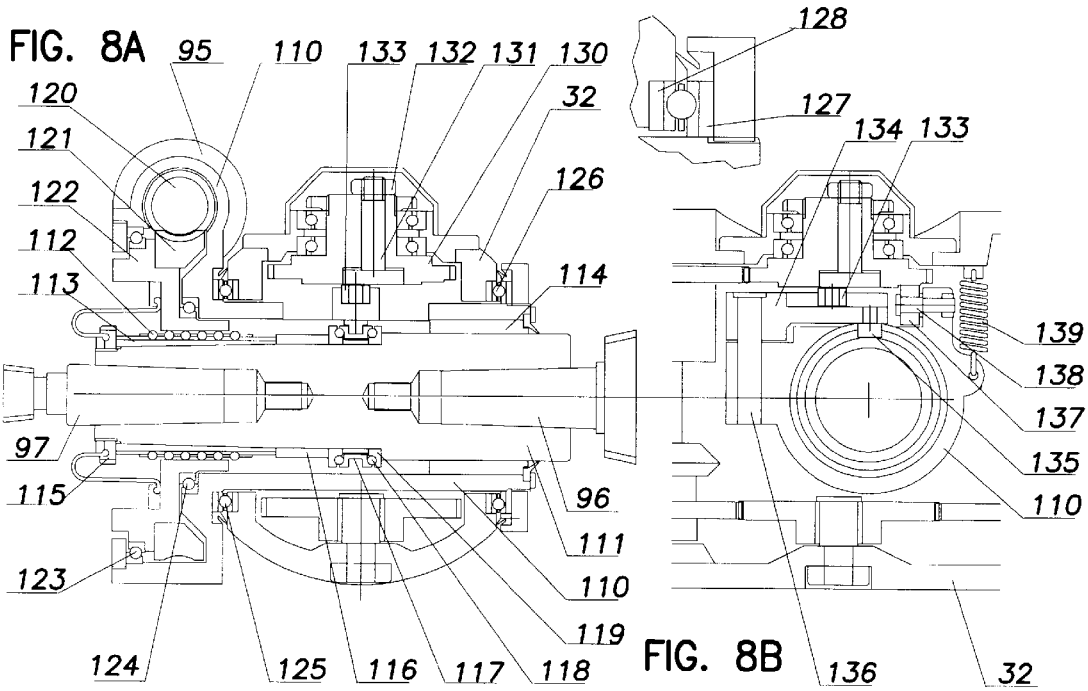
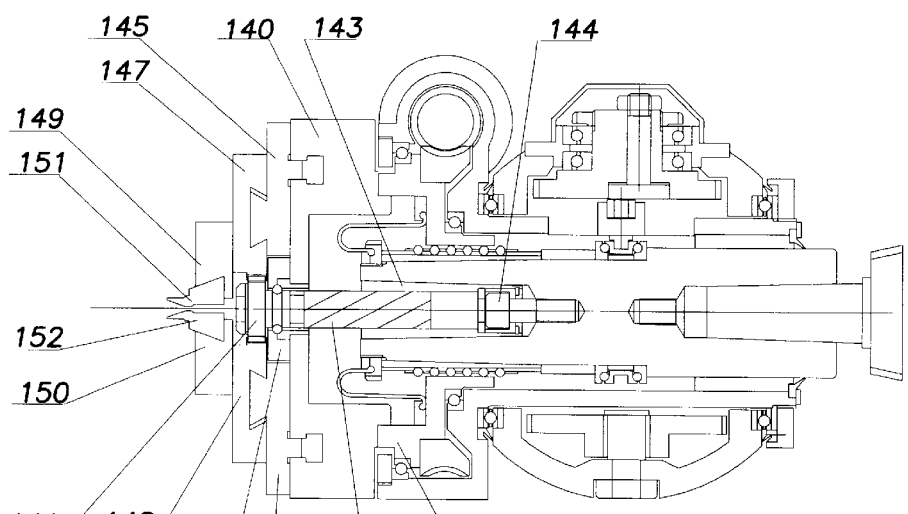
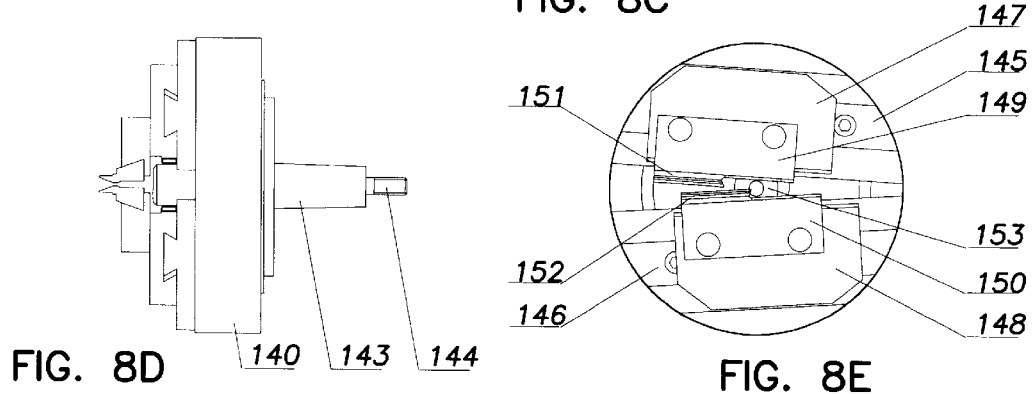

COMPACT MACHINING CENTER FOR MULTIFUNCTION

FIELD OF THE INVENTION

The present invention pertains to a metal cutting machine tool, particularly, a multifunction machining center able to complete most or all machining processes on one complex workpiece during loading and unloading.

BACKGROUND OF THE INVENTION

British patent application GB2212753 suggested adding a power transmission train in the tool turret of an NC lathe to drive driven tools of the turret so as to complete turning, drilling, and milling once a workpiece is clamped.

In fact, limited by the diameter of the turret and the workpiece, except for turning tools, very few driven tools can be held on the turret. So only a few and simple drilling and milling operations can be performed after turning.

Second, the tool exchange accuracy of a turret depends on high precision of the turret and the tools. This means higher manufacturing cost, and consuming more time in tool adjustment.

Moreover, all driven tools are located in a center plane through the workpiece axis, so it is impossible to drill holes or mill faces offset from the center plane of the workpiece, like milling a gear using a disc cutter.

German patent application DE3702424A suggested adding a Y axis guide pair and servo driver to make the turret movable in a direction perpendicular to both the Z axis and the X axis, so that the driven tools held on the turret can machine holes or faces offset from the center plane of the workpiece, including a spline shaft or small spur gear.

The disadvantages of this suggestion are: A) due to an additional moving freedom in the Y axis direction, the position accuracy and cutting rigidity between the cutting tool and the workpiece will be lower and the manufacturing cost will higher than with an ordinary turret lathe; B) inability to machine oblique hole, face or mill helical gears or hob gears; and C) limited by turret size, very few driven tools can be employed to perform few and simple drilling or milling.

Japan patent application JP406226510A disclosed a variable angle driven tool attachment which can attach to the turret of a NC lathe, and comprises a body attached to a turret, a driven tool head supporting a driven arbor rotatably mounted on the body, and a transmitting chain transmitting power from a power supply shaft in the turret to the driven arbor. By changing the angle of the driven tool head, the driven tool can drill or mill the workpiece in arbitrary angles in the center plane of the workpiece. This enables an ordinary turning center to machine oblique holes, faces and spherical surfaces.

The disadvantages of this invention are: A) The narrow space in the variable angle driven tool attachment limits the transmitting power, and the size of the driven arbor, so that only small holes or faces can be machined at low efficiency; B) it is not reasonable to attach several such attachments to a turret, so it is difficult to machine an oblique step screw hole; C) not able to machine holes or faces offset from the center plane of the workpiece, not able to mill or hob gears; and D) limited by turret size, very few driven tools can be employed to perform few and simple drilling or milling.

UK patent application GB2215251A published a two work spindle machine tool for machining both ends of a rotationally symmetrical workpiece. This machine tool comprise a first headstock supporting a first work spindle and movable in the Z axis direction, a second headstock supporting a second work spindle and movable in the X axis direction transversely to the Z axis, a drum turret serving the first work spindle indexably supported on a slide movable in the X axis direction; and a star turret serving the second work spindle indexably supported on a slide movable in both the Z axis and the Y axis directions; 5 guide pairs and servo drivers moving and locating the two headstocks and two turrets, 3 index servo drivers to index the two turrets and the second work spindle. In this machine tool, one end of a workpiece clamped on the first work spindle can be turned by turning tools carried on the drum turret, then the workpiece can be clamped automatically by the second work spindle, and the other end of the workpiece is machined by turning tools and driven tools carried on the star turret. By controlling the movement and rotation of the star turret, the driven tools can move to arbitrary positions and angles, so that the oblique holes and faces on workpieces can be machined. When a workpiece clamped on the second work spindle is machined, another workpiece clamped on the first work spindle can be machined at the same time, so that the production of this machine tool is higher.

The disadvantages of this invention are: A) 5–6 precision guide pairs and 8–10 precision servo drivers are employed to realize the two end machining functions, which makes this machine tool cost very high and complicated; B) limited by the turret space, very few driven tools can be employed to perform few and simple drilling or milling.

U.S. Pat. No. 3710466 suggested a NC lathe, the planiform or cylindrical tool magazine of which is arranged a plurality of axial or radial turning tools, the headstock of which holds a rotatable work spindle that can move along the work spindle axis and at least one direction perpendicular to the work spindle axes, by means of the relative movements between the work spindle and the tool magazine in a plane or a cylindrical surface perpendicular to the Z axis, the workpiece can be positioned into the cutting plane of each selected tool sequentially, so as to increase the available tools and complete total turning process of a Complex workpiece.

The disadvantages of this design are: A) the moving freedom of the work spindle in the direction perpendicular to the work spindle axis will decrease the radial rigidity of the work spindle, in which case, the spindle driven system and the unbalance force of the workpiece will cause considerable vibration, and decrease the radial turning accuracy, and limit the spindle power and speed; B) even though driven tools can be arranged on the cylindrical tool magazine indexable in definite angle increments, these driven tools can not be used in arbitrary angles to machine holes, surfaces and gears, and if rotate the cylindrical tool magazine to arbitrary angles, the position accuracy and the rigidity of the turning tools held on the same cylindrical tool magazine will decrease.

In fact, a practical machine component needs a variety of further machining after turning and simple drilling or milling to complete, such as drilling, boring, tapping for oblique holes, milling, hobbing, shaping, planing, shaving, lapping for gears splines, internal gears, spur or spiral bevel gears, hardening, grinding for external or internal cylindrical or tapers or for large or oblique planes or curved surfaces, grinding for spur gears, helical gears, splines, spur or spiral bevel gears, and broaching for internal splines or shaped holes.

According to the above described prior art and conventional technology, a complex practical workpiece can only be partially completed on one turning center or machining center, and then is carried by robots and auto delivering means to subsequent machining centers until it is finished.

It is very difficult and complicated and will cause accuracy loss for different workpieces to relocate and reclamp automatically on the next machining center, and sometimes it is impossible if no special fixture for this workpiece has been prepared. The automatization of this task is still a big, difficult object of present machinery engineering.

SUMMARY OF THE INVENTION

The main object of the present invention is to avoid disadvantages in the above described prior art and conventional technologies, and provide new compositions of multifunction machining center. The suggested machining center will be small and simple, can arrange enough turning, drilling, milling tools as well as various working units like laser machining unit, quenching coil, grinding unit, gear milling, hobbing, shaping, planing unit, broaching unit etc. so that once a workpiece is clamped all rotational surfaces, and all holes, screw holes, slots, cracks, planes, curved surface characters, artistic patterns in arbitrary angles and arbitrary position, as well as internal or external, spur or helical gear, bevel gear, worm gear, spline can be machined, then can be added quenching and precise grinding.

To further machine the second end of a workpiece, by the aid of a finished axial hole, or taper hole, or spline hole, the workpiece can be fixed automatically on a fixture of the second work spindle, this fixture may be changeable or pre-machined on the second work spindle automatically according to the finished hole of the workpiece.

In some cases this newly designed multi-function machining center can replace a FMS that is composed of a turning center, machining center, gear cutting machine, laser machining center, grinding center, measuring machine, delivering robot and a computer system.

The main method of the present invention is making the following improvements to the conventional turning center:

A. Eliminate the turret, limit the moving freedom of the work spindle in the direction perpendicular to the work spindle, add a Y axis guide rail and Y axis servo driver, so that the tool magazine can move along the plane perpendicular to the Z axis relative to the work spindle.

B. The tool magazine is frame-shaped, and is composed of a standing part and rotatable part, on the standing part, at least one row of fixed axial tools (for internal turning or slotting) and at least one row of fixed radial tools(for external surfaces turning or planing) are arranged, and by means of the movements of the tool magazine in the plane perpendicular to the Z axis, each selected tool can be put into the cutting area of a workpiece sequentially, so all turning processes, as well simple planing or slotting on a workpiece can be performed. Because the turning tools are held on the standing part of the tool magazine directly, and because the headstock is fixed directly on the bed, or can only slide on the bed along the Z axis, the turning tools have high radial position accuracy and high radial rigidity relative to the spindle, thereby ensuring a high turning efficiency and precision.

C. The rotatable part connects the standing part through rotary surface, so can rotate on the standing part around an A axis parallel to an X axis or Y axis, or can be locked at an arbitrary angle by a fastening mechanism. At least one driven arbor perpendicular to the A axis is arranged on the rotatable part. By holding suitable tools to the arbor and adjusting the rotary part to prescribed angles, not only can oblique holes and surfaces be machined, but also milling, planing, hobbing, chamfering, shaving, lapping, grinding for spline, spur or helical gear, bevel gear, worm gear can be completed.

In order to machine more complex workpiece, said rotatable part can include more driven arbors holding different tools to perform drilling, boring, milling, hobbing etc. on one workpiece. These arbors are arranged along the A axis, and in the distance of $S1=D+d+\delta1$, to avoid the second tool conflicting with workpiece when the first tool is cutting. In that formula. D=maximum diameter of workpiece, d=average diameter of two neighboring tools, $\delta1$=sum of gaps between workpiece and two neighboring tools when the workpiece is between the two tools.

To machine holes, planes, and gears in different angles on a single workpiece, an A axis servo driver and a powered fastening mechanism must be employed on the tool magazine. In this case, two or more rows of driven arbors can be arranged on the rotatable part, or both ends of each arbor can hold tools.

Considering that most drilling or milling after turning for a practical workpiece needs tools parallel or perpendicular to the workpiece axis, it is reasonable to arrange at least one row of driven arbors parallel to workpiece axis, and at least one row of driven arbors perpendicular to the workpiece axis on the standing part of the tool magazine. These arbors are arranged along the X axis or Y axis, and at the distance of $S1=D+d+\delta1$, the meaning of this formula is the same as above.

The driven arbors parallel to the workpiece axis can hold drills, borers, reamers, tappers, finger milling cutters to machine holes, screw holes or sunken surface on the end face of workpiece parallel to the workpiece axis. The driven arbors perpendicular to the workpiece axis can hold drills, borers, reamers, tappers, finger milling cutters to machine holes, screw holes, on the external surface of the workpiece perpendicular to the workpiece axis.

To hob gear or spline or worm gear by generation method, it is necessary to equip an encoder on the tool magazine. This encoder can be mounted on or coupled with at least one driven arbor. With the aid of the control circuit of the machine tool and the C axis servo driver, the work spindle can be synchronized with said driven arbor.

The frame-shaped tool magazine may comprise one segment or several segments including said rotatable part. These segments connect each other perpendicularly to form a frame, the frame may be in the shape of 'L', 'U', 'H', 'Ħ', and so on or of the combination of these shapes.

Having enough space, more tools and working units as follows can be arranged on said frame-shaped tool magazine:

An inducing quenching coil or a laser nozzle, for hardening the workpiece surface automatically after turning, milling or hobbing, so as to further perform precise grinding. The laser nozzle can perform more machining, such as plate cutting, holing, engraving, welding.

An external grinding unit and an internal grinding unit mounted on the rotatable part of the frame-shaped tool magazine, for grinding internal or external, cylindrical or taper surfaces, parallel or oblique planes, cam or complex curved surfaces in high precision. The grinding wheel may be dressed linearly or curvedly by a dresser mounted on the headstock.

A gear shaping unit, mainly for internal gear or stepped gears cutting.

A bevel gear cutting unit mounted on said rotatable part, for straight or spiral bevel gear cutting.

A gripper or an outlet of a blank feeder for short blank loading.

A measuring sensor, for finished workpiece measuring, or for measuring a trial-cut workpiece, so as to check and adjust cutter position.

Furthermore, a cutting tool measuring sensor can be equipped on the headstock, which is programmed to measure the edge position of new or used cutters, and then check and adjust the position data of the cutting tool automatically. This will lengthen the cutter's life, and save time for tool adjusting and holding.

In order to complete the second end of a workpiece, opposite to said (or main) headstock, a second headstock supporting a second work spindle which is coaxial with said (or main) work spindle is settled on the other side of the frame-shaped tool magazine.

Another method without using a second headstock is to employ a rotatable gripper on the tool magazine. This gripper can grab an unfinished workpiece from the work spindle, and reverse it 180 degrees, then return that workpiece to the work spindle so it can be reclamped.

If necessary, to machine some precise shaped hole (like internal spline) during machining processes, a broaching unit and a broach cycle mechanism may be employed on the bed or on the tool magazine.

DESCRIPTION OF THE DRAWING

FIG. 1A shows a single spindle turning milling center, of which the tool magazine is arranged only one row of driven arbors.

FIG. 1B shows the frame-shaped tool magazine of the turning milling center of FIG. 1A viewing from the work spindle.

FIG. 1C is a top view of the frame-shaped tool magazine.

FIG. 2A shows a single spindle turning milling center, of which the frame-shaped tool magazine has arranged thereon one row of axial fixed tools, one row of radial fixed tools, one row of driven tools parallel to the Z axis, one row of driven tools perpendicular to the Z axis and a rotatable arbor box.

FIG. 2B is a cross-sectional view of the turning milling center shown in FIG. 2A.

FIG. 3A shows a frame-shaped tool magazine employing arbor-reducer-motor sets.

FIG. 3B is a side cross-sectional view of the frame-shaped tool magazine shown in FIG. 3A.

FIG. 3C shows another frame-shaped tool magazine with both axial and radial driven arbors and a rotatable multi-arbor box.

FIG. 3D is a top cross-sectional view of the frame-shaped tool magazine shown in FIG. 3C.

FIG. 4A shows a frame-shaped tool magazine with rotatable multi-arbor box driven by an A axis servo driver.

FIG. 4B is a side cross-sectional view of the frame-shaped tool magazine shown in FIG. 4A.

FIG. 4C is a top view of the frame-shaped tool magazine shown in FIG. 4A.

FIG. 8A is an axial cross-section view of a gear shaping unit.

FIG. 8B is a lateral cross-section view of the gear shaping unit.

FIG. 8C is an axial cross-section view of the gear shaping unit with a bevel gear planing attachment attached.

FIG. 8D is a side view of the bevel gear planing attachment.

FIG. 8E is a front view of the bevel gear planing attachment.

DETAILED DESCRIPTION OF THE PREFERRED EMBODIMENT

Figure 5A:
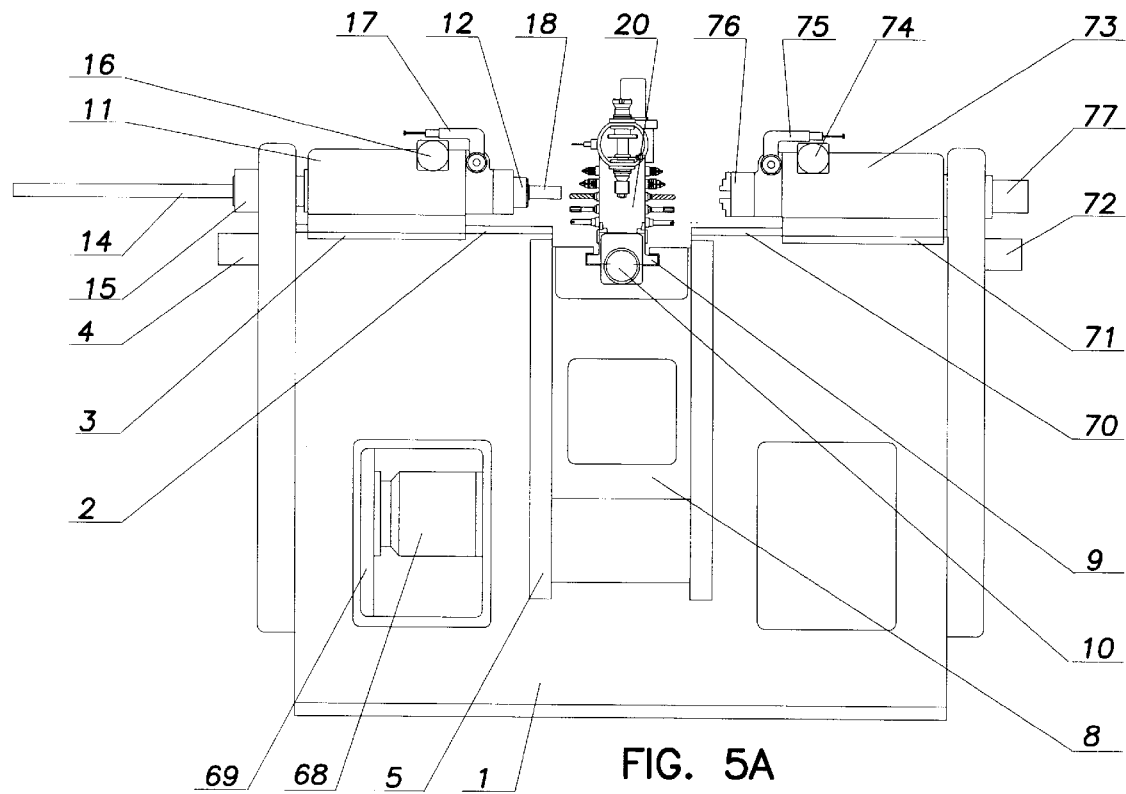
FIG. 5A shows a double spindle turning milling center with the frame-shaped tool magazine shown in FIG. 4A.

FIG. 1 shows a turning milling center with the simplest frame-shaped tool magazine.

In FIG. 1, bed (1) has a vertical Y guide rail (5) on its front, and a horizontal Z guide rail (2) on its top. The headstock (11) has a guide surface (3) on its bottom, can slide on the Z guide rail (2) of the bed (1). The location and the movement of the headstock(11) are controlled by a Z axis servo driver (4).

A work spindle (12) is rotatably supported by the headstock. In the turning operation, the work spindle is driven by a main motor directly or through a transmission chain. When drilling or milling, the work spindle is switched to and driven by a C axis index servo driver (16).

The work spindle may be coupled with a C' axis encoder, so as to decide rotary angle, or to cut a screw thread.

Another method of C axis control is to combine the main motor and the C' axis encoder, without an independent index servo driver (16).

At the back of the work spindle (12) a bar feeder (15) is equipped for automatically loading, to that the bar feeder can be replaced by a gripper (19), which can draw out the bar from the spindle automatically. A frame-shaped tool magazine (20) has an X axis guide rail (9) under the bottom, and can slide on the top X guide surface of the Y—X slider (8), and is controlled by an X axis servo driver (10) to move and locate.

The Y—X slider (8) has a Y guide surface perpendicular to the X guide surface on its front, and can slide on the Y guide rail (5) of the bed (1), and controlled by a Y axis servo driver (7) to move and locate in the Y direction.

A tool measuring sensor (17) is equipped on the headstock (11). It can turn round a pivot (or stretch out or retract back). During machining it is in a position avoiding conflict with the tools and while measuring it turns back (or stretches out) to a measuring position.

This action may be driven by a hydraulic cylinder, or a pneumatic cylinder, or an electric motor. The sensor (17) can detect the accuracy position of cutter edges, so that the tool holding and tool pre-adjusting process can be simplified.

The above servo drivers for linear movement may comprise a feed screw means and a stepmotor or a servomotor with feedback device, the C axis index servo driver may comprise an index worm gear pair and a step motor or a servo motor with feedback device.

The guide rails and the guide surfaces mentioned above may be a common slide guide pair with or without plastic surfaces, or a hydrostatic guide pair, or a rolling guide pair.

FIG. 1B and FIG. 1C are two views of the frame-shaped tool magazine (20).

The frame-shaped tool magazine in this embodiment is in the shape of a "U". The lower segment (31) has an X guide rail on its bottom, and a circle T slot on its top, and the right segment (40) is fixed on the top of the lower segment (31). The left segment is a rotatable multi-arbor box (32) with one row of 5 driven arbors (33) is arranged on it, and these 5 arbors are driven by one motor (35), and the speeds of each arbor are reduced from bottom to top step by step.

These arbors can hold drill, tap, reamer, borer or finger milling tools. etc., and the top arbor (34) can hold a long arbor (38), on which 1 to 4 disc milling tools, like disc saw, 3 edges cutter, gear tooth cutter, angle slot cutter and gear hobber can be held, so that slots, seams, planes, external spline, spur gear, bevel gear can be machined on the workpiece. In order to perform hobbing, a Q axis encoder is mounted on or coupled with arbor (34). The multi-arbor box (32) can swivel round a pivot (36), so as to machine some holes or faces oblique to the Z axis, or mill helical gears, hob gears or worm gears. A bearing holder (37) for supporting a long arbor is fastened by the T slot on the top of right segment (40). The swivel angle of the multi-arbor box (32) is indicated by an angle indicator (54).

Right segment (40) is a turning tool post, one row of 7 radial fixed tools (41) such as external turning tools, planing tool, smoothing roll, knurl wheel, honing tool, etc., and one row of 6 axial fixed tools (42) such as internal turning tool, drill, reamer, tapper, screw die and slotting cutter is arranged. A sensor (43) for workpiece measuring is also provided.

This embodiment is suitable for both bar and short blank. In order to load or unload short blank automatically, a loading and reversing gripper (19) is employed on the frame-shaped tool magazine. When loading, first the gripper moves in the X-Y plane to grab a blank in the blank feeder, then moves to aim the work spindle. Third, the work spindle opens its chuck, moves in the Z direction to the workpiece, and then clamps the workpiece. Fourth, gripper (19) opens jaws and moves out. The gripper can also grab one end of a finished workpiece, then reverse it 180 degrees, and let it be reclamped by the spindle chuck, so as to continue its second end machining. But this is suitable only for a short blank.

This gripper can also grab and carry a finished workpiece from work spindle to outlet.

As shown in FIGS. 1A and 1B, the gripper (19) is composed of a body, at least two pairs of jaws, and hydraulic cylinders. The jaws of each pair are slidably supported by the body, and are driven by an independent hydraulic cylinder to move oppositely, syncromeshly and symmetrically. Each jaw is made of a "V" concave facing the other jaw of the same pair, two "V" concave of the jaws in one pair forming a symmetrical rhombus, the geometrical center of this rhombus is identical when the jaws are driven by the cylinder to move symmetrically, and at least two pairs of jaws are parallelly arranged on the body, the rhombus centers of each pair of jaws are arranged to be coincided with an axis parallel to the work spindle axis. Therefore this gripper can grab a stepped or taper blank, and ensures the axis of the grasped workpiece uniform when different sized workpiece is grasped.

The gripper (19) is mounted on a rotating mechanism (21), the rotating mechanism (21) is supported rotatably on the frame-shaped tool magazine, and is driven by an hydraulic cylinder, or pneumatic cylinder or electric motor to reverse the grasped workpiece to 180 degrees accurately.

In the condition of without conflicting between tools and the workpiece, the parallel arrangement of tools takes up a small space.

The outline of the frame-shaped tool magazine mainly depends upon the number of arranged tools and the distance between two neighboring tools. The distance S1 is concerned with the maximum diameter of the workpiece and the average diameter of the cutting tools, generally, $S1=D+d+\delta 1$, where $\delta 1$ is a sum of two gaps between the workpiece and two tools when the workpiece is inside the two tools. For this reason the tools may be arranged at different distances, the distances between arbors holding high speed small tools may be smaller, and the distances between arbors holding low speed large tools should be larger. For example, when D=60 mm, D=20 mm, $\delta 1$=5 mm, S1=85 mm.

A parallel arrangement for a plurality of fixed radial tools has highest space efficiency.

The first method for a fixed radial tool arrangement is to arrange tools in the direction perpendicular to the direction of tool radial feeding. In this instance, the minimum distance of two tools should be $S2=D/2+B+\delta 2$, where B is a thickness of the tool, $\delta 2$ is a gap between the workpiece and the second tool when the first tool is cutting. For example, D=60 mm, B=15 mm, $\delta 2$=5 mm, S2=50 mm.

If the fixed radial tools must be arranged horizontally, the first method will make it inconvenient to observe the tools. For convenient observation, the second method can be employed, that is, standing a plurality of oblique prism tools parallel to each other on a horizontal tool post.

The top of the prism tools is ground a rake, the oblique angles forming a clearance, or a tip can be attached to the top of the prism tools, and the radial feeding direction of these tools are horizontal. Such tools arranged in this manner will be convenient to observe and to have their tip changed or ground.

In this case, the minimum distance between two tools is: $S3=D+B+\delta 2$, for example, D=60 mm, B=15 mm, $\delta 2$=5 mm, S3=80 mm.

In order to arrange more tools horizontally in a limited space, the third method can be considered, that is standing two opposite oblique prism tools back to back like a "V", or attaching two opposite tips back to back on the top of a standing bar, and arranging several such pairs of "V"-like prism tools or standing bars with two opposite tips along the segment of the frame-shaped tool magazine.

In this case, the space between two back to back tools is S4=D/2+B+δ2, the space between two face to face tools is S5=D+δ2, and the average distance between two tools is S6=(1.5D+B+2δ2)/2. In the same condition as the above example, S3=60 mm.

All driven arbors in the frame-shaped tool magazine shown in FIG. 1 can be driven by a sharing speed-controllable motor through a transmission. Alternatively, each arbor can be driven by a motor via a reducer. A suggestion is to produce an arbor-reducer-motor set in standard outer size.

The disadvantage of the turning milling center shown in FIG. 1 is that it can only choose one of following status to work: A) the driven tools perpendicular to the work spindle; B) the driven tools parallel to the work spindle; or C) the driven tools oblique to the work spindle. So it is only fit for a simple workpiece.

Considering that a majority of drilling or milling for a conventional workpiece after turning needs tools parallel or perpendicular to the workpiece axis, the second embodiment shown in FIG. 2 employs a 目 shaped tool magazine. The upper segment (47) of the tool magazine has arranged thereon one row of 4 driven arbors perpendicular to the workpiece axis, the middle segment of the tool magazine has arranged thereon one row of 4 driven arbors parallel to the workpiece axis, so holes and surfaces on the workpiece which need tools perpendicular or parallel to the workpiece axis can be completed together.

Furthermore, a rotatable arbor box supporting a driven arbor (34) is attached to the right end of the upper segment (47), the rotary axis of the arbor box is the A-axis parallel to the X axis. The arbor (34) can hold a long arbor (38), on which a hobbing tool, disk cutter, etc., can be held to hob a gear or a mill slot.

The left segment of the tool magazine has arranged thereon one row of 5 radial fixed tools (41) along the Y axis, and the middle segment has arranged thereon one row of 5 axial fixed tools (42)along the X axis near the lower border.

An electric motor (35) is fixed on the lower portion of the frame-shaped tool magazine so as to supply higher power.

Because the gripper (19) is rotatable, a disc like horizontal workpiece bank (22) is employed. Workpieces or blanks in the shape of cylinders or tapers or steps stand on the disc bank, and are grasped vertically by the gripper (19). The disc bank (22) may also be replaced by a conveyer.

Similar to the tool magazine as shown in FIGS. 2 and 3A, FIG. 3B shows a frame-shaped tool magazine employing arbor-reducer-motor sets. The upper segment (47) of the tool magazine includes one row of holes in which arbor-reducer-motor sets perpendicular to the Z axis are inserted. The holes on the left segment (52) receive one row of arbor-reducer-motor sets parallel to the Z axis. Each arbor-reducer-motor set comprises a standard arbor assembly (48) or (49) and reducing box (50), and a motor (51), which can be combined optionally according to different requirements of speed or torque or performance. Motor (51) can be electric or pneumatic or hydraulic.

Compared with FIGS. 3A and 3B, in FIGS. 3C and 3D, a rotatable multi-arbor box (32) is added to the frame-shaped tool magazine. The rotatable multi-arbor box has arranged thereon one row of 4 driven arbors which can hold tools on both ends, so as to machine complex holes and surfaces oblique to the workpiece axis or spiral slots or helical gears, etc. The rotatable multi-arbor box (32) has coaxial rotary surfaces on both ends that are meshed with the rotary surface on the standing part of the frame- shaped tool magazine, operating the fastening mechanism (44). The rotatable multi-arbor box (32) can rotate about an A axis parallel to the Y axis, or be locked at a prescribed angle. The rotary angle of the multi-arbor box is indicated by an indicator (54). A Q axis encoder connected with a control circuit is mounted on the arbor (34), so as to hob gears or splines.

The turning tool post (46) has arranged thereon external turning tools (41) and internal turning tools (42). A sensor (43) for workpiece measuring is also included.

If a second work spindle is used, a rear tool post (57) should be added on the other side of the tool magazine. The rear external turning tools (55) and rear internal turning tools (56) arranged on the rear tool post (57), are used to turn the workpiece on the second work spindle. The rear tool post (57) is shorter than the front tool post (46), so as to permit the second work spindle to move and clamp the workpiece which is to be cut off on the main work spindle.

The ends of the driven arbors arranged on the rotatable multi-arbor box and on the right segment have taper holes or chucks (58) so that the workpiece on both work spindles can be machined. A measuring sensor (176) for measuring the workpiece on the second work spindle is also provided.

In addition to general turning operations, the turning milling center shown in FIG. 1 and FIG. 2 is capable of turning taper screw threads when C', Z, X axes are interpolatingly controlled; and turning cams or relieve teeth when C', X axes are interpolatingly controlled. While driven tools are used, in addition to common holes or surfaces machining, the turning milling center is capable of milling end cam when C and Y (or X) axes are interpolatingly controlled; or milling cylindrical cam when C and Z axes are interpolatingly controlled; or engraving a 3D curved surface when C, Y, Z axes are interpolatingly controlled; or milling a spur gear or a spline automatically when a C axis index function is used, or milling a bevel gear when the C axis index function is used and Z, Y axes are interpolatingly controlled. Utilizing the signal from the Q axis encoder and synchronizing the C axis of the work spindle, a spur or helical gear or a spline or worm gear can be hobbed. When Q, C and Y axes are interpolatingly controlled, a worm gear can be hobbed by a single cutting tip.

The disadvantage of the tool magazine shown in FIGS. 1–3 is: If the holes or surfaces to be machined are complicated (for example, three different-sized step screw hole perpendicular to the workpiece axis are to be machined), 6 driven tools perpendicular to the Z axis might be not enough. Besides, 3 to 4 groups of the same driven tools may have to be held on the different multi-arbor boxes for machining holes or faces at different angles.

This disadvantage can be avoided by adding an A-axis servo driver on the frame-shaped tool magazine to drive the rotatable multi-arbor box. According to the control program, the A-axis servo driver rotates the multi-arbor box to any prescribed angle, so that each driven tool on the multi-arbor box can be used at different angles, and one controllable rotatable multi-arbor box can replace three different uncontrollable arbor boxes on the frame-shaped tool magazine shown in FIG. 3C.

Additionally, 2 or more rows of driven arbors can be arranged around the A-axis of the rotatable multi-arbor box. Thus, either the dimension of the rotatable multi-arbor box is reduced or the available driven tools are doubled.

The upper segment of the frame-shaped tool magazine shown in FIG. 4 is a rotatable multi-arbor box (32), the ends of which are coaxial rotary surfaces, and meshed with the rotary surface of the standing part, so the multi-arbor box can rotate about the axis parallel to the X axis, and is driven by an A-axis servo driver (66), or is locked at a prescribed angle by a hydraulic (or electric) fastening mechanism. The rotatable multiarbor box has arranged thereon one row of 6 driven arbors (33), these arbors are parallel each other, and both ends of the arbors have chucks, so as to hold 12 driven tools. Each tool can machine the two ends of the workpiece at angles parallel or perpendicular or oblique to the Z axis.

If necessary, more driven arbors can be arranged on the rotatable multi-arbor box in rows perpendicular to the arbors (33). Thus, at most, 24 driven tools can be held; on the other hand, the multi-arbor box can be shortened.

For gear hobbing, at least one arbor (34) is mounted on a Q axis encoder (or a pulse generator) (65), or coupled with the encoder through a transmission chain.

The left segment of the frame-shaped tool magazine is an axial fixed tool post, and both the front and rear side of this segment can have arranged thereon at most 10 axial fixed tools (42) and (56) respectively. The lower segment of the frame-shaped tool magazine has two radial fixed tool posts, the front tool post can have 8 external turning tools (41), and the rear tool post can have 6 external turning tools (55). The fewer tools arrangement of the rear tool post is to permit the second work spindle to move and clamp the workpiece on the main work spindle being cut off.

Measuring sensor (59) is provided to measure the workpiece on either work spindle and to check the position data of the cutting tools. The measuring sensor (43) mounted on the standing segment of the tool magazine has smaller measuring errors, but is not convenient to measure holes or sunken on the periphery of the workpiece.

A bank (99) for storing changeable fixtures, such as chucks, fixtures or screw nuts is provided. The bank is used to fasten an unfinished workpiece on a core shaft on the second work spindle.

Figure 5B:
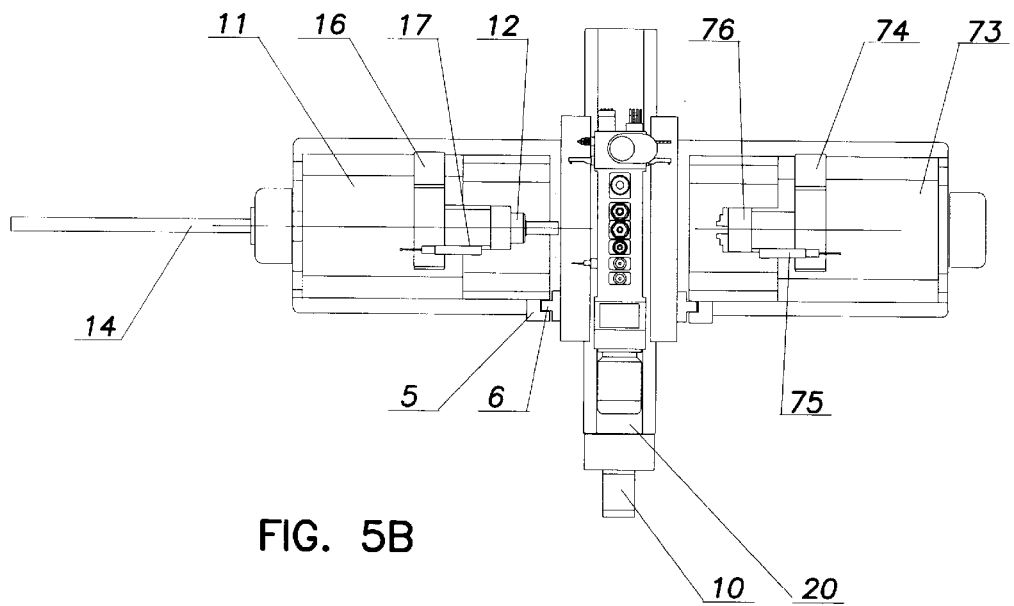
FIG. 5B is a top view of the turning milling center shown in FIG. 5A.

FIG. 5 shows the third embodiment, a double spindle turning milling center employing a frame-shaped tool magazine shown in FIG. 4.

As shown in FIG. 5, the bed (1) has a vertical Y axis guide rail (5) on the middle, and two horizontal, coaxial Z, Z1 guide rails (2), (70) on the top of both sides. The main headstock has a guide surface (3) which can slide on the Z guide rail (2), and is controlled by a Z axis servo driver (4) to move and locate. The second headstock has guide surface (71) that can slide on the Z1 guide rail (70), and is controlled by a Z1 axis servo driver (72) to move and locate.

In the frame-shaped tool magazine (20), each segment of which is parallel to X and Y axis, the lower segment has X guide rail (9) which can slide on the top X guide surface of slider (8), and is controlled by X axis servo driver (10) to move or locate. The slider (8) has Y axis guide surface (6) perpendicular to the X slide surface on both sides, can slide vertically on the Y guide rail (5) of the bed, and is controlled by Y axis servo driver (7)to move or locate.

The main work spindle (12) is supported in the main headstock with an axis parallel to the Z axis, and is either driven by a main motor (68) while turning, or coupled with a C axis index servo driver(16)while drilling or milling, and is coupled with a C' axis encoder to define angular position or for screw thread cutting.

Alternatively, the main work spindle can be controlled by a C axis closed loop servo system comprising the main motor and the C' axis encoder without the independent C axis index servo driver (16).

A bar feeder is on the back of the main work spindle for automatic loading.

Similarly, the second work spindle (76)is supported in the second headstock with an axis parallel to Z axis, and is driven by the same or another main motor while turning, or if necessary, coupled with a C1 axis index servo driver (74) for drilling or milling. The second spindle may also be coupled with a C1' axis encoder. If only turning needs to be performed on the second work spindle, the C1 axis index servo driver may be eliminated.

A pusher (77) is located on the back of the second work spindle to push the finished workpiece out of the chuck (76).

Both headstocks are equipped with a rotatable tool measuring sensor (17) and (75), respectively.

Compared with the above embodiments, this turning milling center has several times more cutting tools available than the former, can machine a more complex workpiece during one clamping, and needs less tool changing or adjustment for different workpieces.

The second work spindle is suitable mainly for the machining of a bar or short blank, and has higher reclamping accuracy.

Some workpieces must be located and clamped based on their finished cylindrical or taper or spline hole on the second work spindle, in which case, a special core or fixture should be pre-machined or prepared on the second work spindle. At first, the core is inserted into the finished hole of the workpiece on the main work spindle, and next, with the workpiece, the core is twisted into a screw nut placed in the fixture bank of the tool magazine, and fastened. Now the workpiece is clamped exactly on the second work spindle.

Controlled by the program and according to the requirements of the workpiece, all the above processes can be completed automatically.

This turning milling center can machine not only rotary workpieces, but also non-rotary workpieces such as small gear boxes, frames, dies, blades, etc., of which the outline should not exceed the permitted maximum cylinder.

The turning ability of this turning milling center is equal to a double spindle NC lathe, and the drilling and milling ability is equal to a 5-axis machining center. The measuring ability is equal to a 5-axis measuring machine.

FIG. 6 shows the fourth embodiment of a multifunction machining center. Besides all of the turning, drilling, milling machining abilities of the above embodiments, it has additional functions like gear shaping, grinding, quenching, broaching, bevel gear planing, etc.

Figures 6A, 6B:
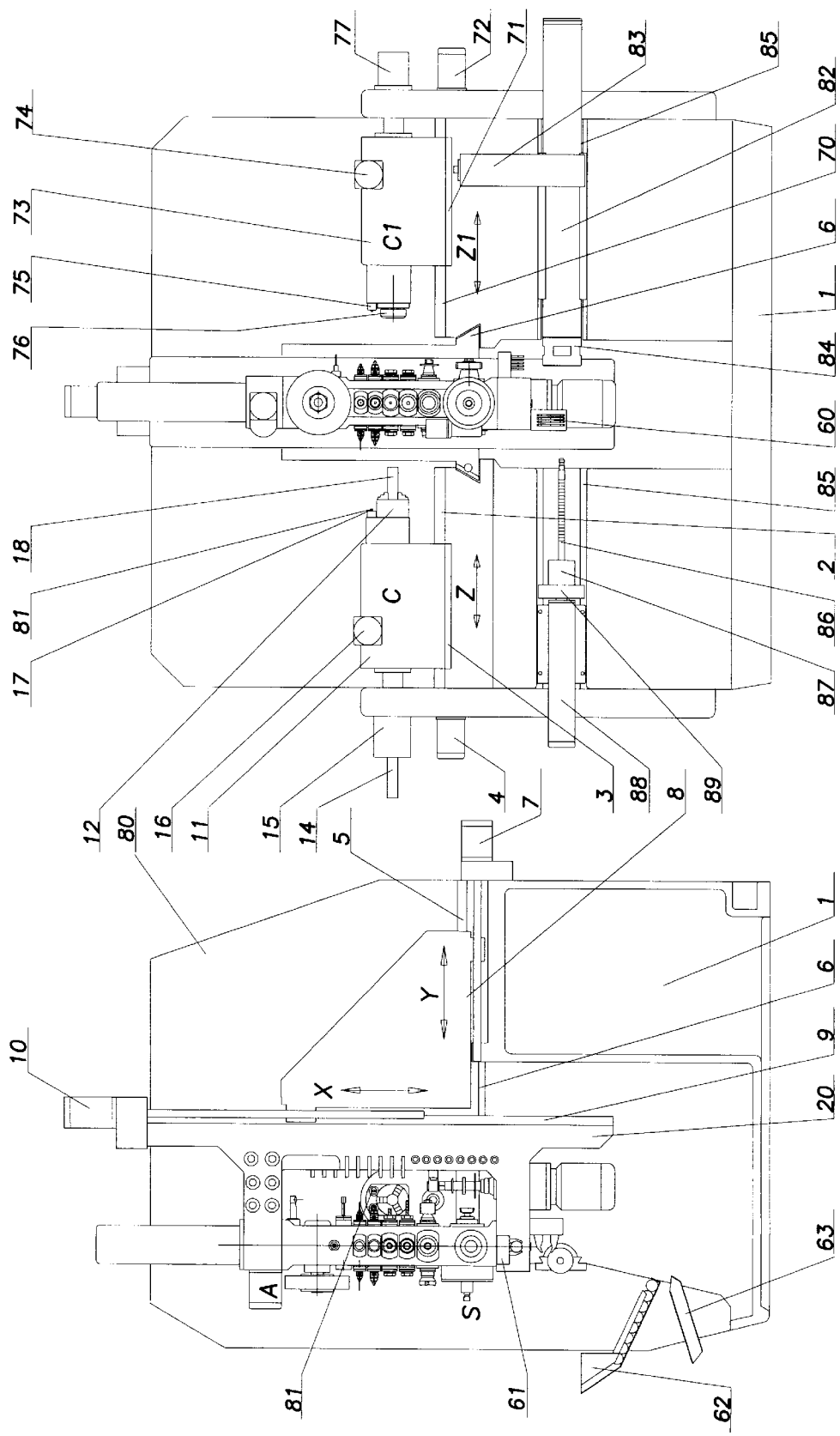
FIG. 6A shows a double spindle multifunction machining center.
FIG. 6B is a side cross-sectional view of the center shown in FIG. 6A.

As shown in FIG. 6A, a frame-shaped tool magazine (20) is supported vertically, and it has X axis guide rails (9) on the back side of the right segment, can slide on the X axis guide surface on the front of slider (8), and is controlled by an X axis servo driver (10) to move or locate. The slider (8) has a horizontal Y axis guide surface (6) on the bottom, can slide on the horizontal Y axis guide rail (5) on the middle top of the bed (1),and is controlled by a Y axis servo driver (7) to move or locate. A main headstock (11) has a guide surface (3) parallel to the main work spindle axis on the bottom, can slide on the horizontal Z guide rail (2) on the top of the left side of the bed (1), and is controlled by a Z axis servo driver (4) to move or locate. A second headstock (73) is supported by horizontal Z1 guide pair (70) (71) on the top of the right side of the bed (1), can slide in the direction parallel to the second work spindle axis, and is controlled by a Z1 axis servo driver (72) to move or locate. The second work spindle (76) supported in the second headstock is coaxial with the main work spindle (12).

On the front side of the bed (1), a broaching unit (82) and a broach cycle mechanism (88) are attached for broaching a precision shaped hole on an unfinished workpiece automatically.

The whole working area is contained by a case (80). A blank feeder (62) for short blank loading, and an outlet (63) for finished workpiece slide out are also provided.

Both headstocks are equipped with a respective measuring sensor for measuring the tools arranged on the tool magazine, and one headstock is equipped with a dresser (81) for the grinding wheel dressing. The measuring sensors (17) and (75) and the dresser (81) are slidably or rotatably supported on the headstock and driven by actuators. The measuring sensors and the dresser can stretch or rotate out to measure cutting tools or the dress grinding wheel, and when they are not used, they can retract or rotate in to avoid conflicting with the workpiece or the cutting tools. The actuator may be electric or hydraulic or pneumatic.

With a dovetail on the outer body, the broaching unit (82) can slide on the dovetail guide way (85) in front of the bed in the direction parallel to the Z axis. A coupling mechanism (83) is used to couple the broaching unit (82) with the second headstock so that the axial position of the broaching unit can be controlled by Z1 servo driver. The broaching unit comprises an outer body; a piston rod (101); a broach chuck (102) attached to the left end of the piston rod; and a workpiece table (84) supported on the left end of the outer body for workpiece bearing (shown in FIG. 7C). Sealed by a sealing sleeve, the outer body and the piston rod are assembled into a hydraulic cylinder (100) which drives the broach passing and cutting a workpiece.

The broach chuck (102) includes a chuck body, a chuck shell (103) out of the chuck body is pushed by a spring to the left end, and a group of jaws(105) are slidably disposed in radial slots in the chuck body. The jaws are stopped by chuck shell (103), and the internal surface of the chuck shell (103) is a stepped cylinder with a taper. When the chuck shell (103) is forced to slide to the right, the jaws can move out more and permit the broach head to be inserted into the chuck body, and when the chuck shell is pressed by the spring to move to the left, the internal taper surface of the chuck shell will push the jaws to move in and stop the broach head.

The broach cycle mechanism (88) is used to send a broach passing through a workpiece hole and insert into the broach chuck (102), or carry a broach from the broach chuck to a start position, and comprises a broach holding chuck (87) slidably supported on the guide way (85) of the bed and coaxial to the workpiece table (84) of the broaching unit, and an hydraulic cylinder fixed on the bed and driving the chuck (87) to move in the Z direction.

The process of broaching is:

A. The broach chuck (102) is pushed by piston rod to the left end, and the chuck shell (103) is pressed by the internal surface of the workpiece table (84), which allows the jaws (105) of the chuck (102) move out radially, so as to permit the head of the broach (86) to be inserted into or drawn out of the chuck hole freely.

B. The gripper (60) grasps a holed workpiece from the work spindle and moves to a position coaxial with the broaching unit.

C. Using the coupling mechanism (83), the broaching unit is coupled with the second headstock, and is pushed by the headstock until the workpiece table (84) is in contact with the workpiece.

D. The chuck (87) holding a broach moves right, until the head of the broach is inserted through the hole of the workpiece, and is inserted into the hole of the chuck (102).

E. When the piston rod (101) moves right, the chuck shell (103) is pushed back by the spring, and the jaws (105) are pushed in to prevent the broach from being pulled out. The piston rod continues moving to the right, until the broach cuts and passes through the workpiece.

F. The gripper carries out the workpiece.

G. The piston rod moves left and the broach chuck (102) pushes out the broach, until the tail of the broach inserts into the chuck (87) of the cycle mechanism. At the same time, the chuck shell (103) is pressed by the internal surface of the workpiece table (84), to permit the broach head to be drawn out.

H. The chuck (87) carrying the broach moves left to a starting position, and thus the broaching cycle of a workpiece is completed.

Figures 7A, 7B:
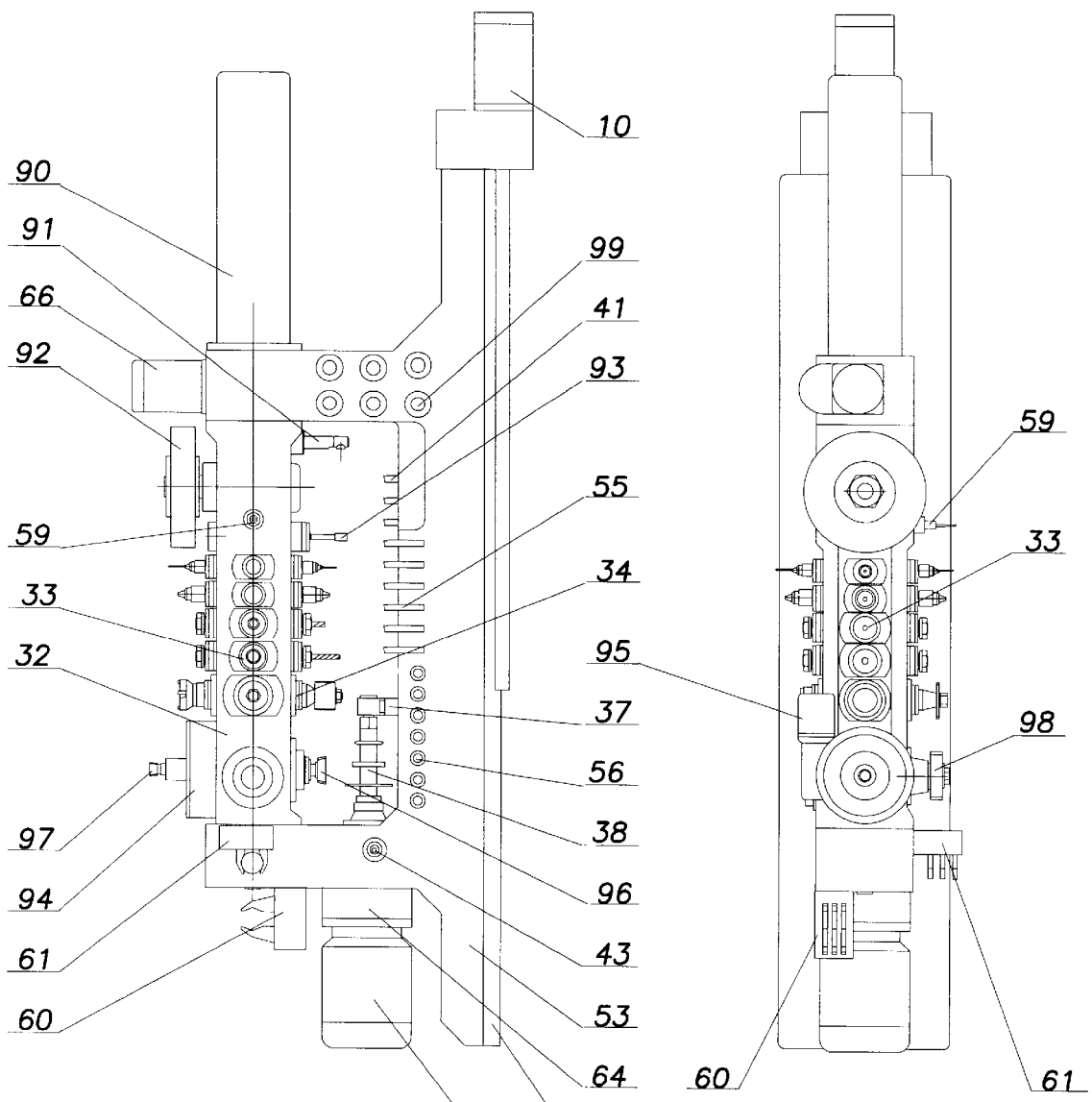
FIG. 7A shows a frame-shaped tool magazine employed in the embodiment shown in FIG. 6.
FIG. 7B is a side view of the magazine shown in FIG. 7A.
Figure 7C:
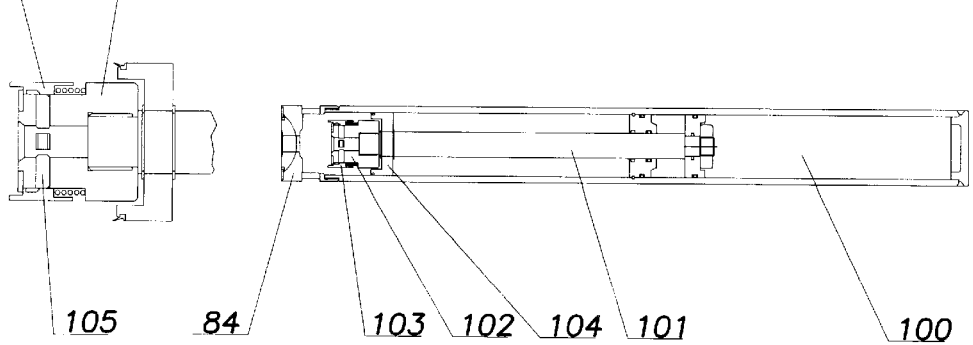
FIG. 7C is a cross sectional view of the broaching unit and an enlarged cross sectional view of a broach chuck.

FIG. 7 shows a frame-shaped tool magazine used in the 4th embodiment shown in FIG. 6. The rotatable multi-arbor box of this tool magazine is equipped with a gear shaping unit (94) inside, which comprises a shell (110), a slide rod (111), an index worm gear pair (120) (121), and a reciprocating mechanism.

Both ends of the slide rod (111) are made with a coaxial taper hole to hold two different shaping tools. Index worm gear pair (120) (121) is driven by an S axis servo driver (95), so that the shaping tool can be synchronized with the work spindle C axis.

This gear shaping unit can cut internal gears, step gears, or can machine non-circular gears when Y, C, S axes are interpolatingly controlled, and can shape a rack when S, X axes are interpolatingly controlled.

On this frame-shaped tool magazine a quenching unit can be equipped to harden the workpiece after turning, milling and before grinding.

The quenching unit may be an inducing coil (169) connected with a high frequency power supply, or a laser nozzle (91).

The laser nozzle (91) is mounted on the rotatable multi-arbor box, and the laser generator (90) may be settled on the frame-shaped tool magazine if small enough. The power light is guided to the nozzle (91) by reflecting mirrors or other means. The laser nozzle can be attached to a reflecting mirror to reflect laser light at a right angle so as to harden the internal surface of a workpiece. Additionally, by means of modulating the power or frequency of the laser generator, or exchanging different types of laser nozzles, the laser unit can do more work like seam cutting, holing, welding, labeling, engraving, etc. The relative position between the laser nozzle and workpiece is controlled over 5 axes, so complex surfaces can be machined.

On the rotatable multi-arbor box (32) of the tool magazine an external grinding unit (92) and an internal grinding unit (93) are equipped, and they may be driven independently by electric motors or pneumatic motors.

The grinding wheel can be dressed automatically by a dresser (81) supported on the headstock.

Because of the grinding units, this machining center has the ability of a 5-axis grinding center, and can grind different internal or external, cylindrical or taper surfaces or planes once a workpiece is clamped. Furthermore, when C (or C1), Y axes are interpolatingly controlled, internal or external cams or end face cams can be ground. When C, Z(or C1, Z1) axis are interpolatingly controlled, cylindrical cams can be ground. When X, Y axes are interpolatingly controlled, curved surfaces can be ground. When X, Y, Z axes are interpolatingly controlled, planetary grinding for coordinate holes or curved slots can be performed.

Considering the grinding wheel can be dressed in straight or curved lines, much more complicated surfaces can be ground. When C or C1 axis is controlling to index the workpiece, spline or spur gears can be ground, and when C (or C1), X axes are interpolatingly controlled, gears can be ground in generation method; when C, Z axes or C1, Z1 axes are interpolatingly controlled, screw thread or helical gears can be ground; when C (or C1), X axes are interpolatingly controlled, the tooth of a disc cutter can be relieving ground; when C, X, Z axes or C1, X, Z1 axes are interpolatingly controlled, a hobber or tapper can be relieving ground.

A bevel gear planing or milling unit can be mounted on the rotatable multi-arbor box, to machine a precise bevel gear in a generation method.

A gripper (60) is used to carry a blank from a blank feeder to the main work spindle, or carry an unfinished workpiece from the main work spindle to the broaching unit, or carry a broached workpiece to a work spindle and let it be clamped by a fixture on that work spindle. A gripper (61) is used to carry the finished workpiece from the work spindle to the outlet. A fixture bank (99) on the frame-shaped tool magazine is provided, which can store centers, fixtures, internal or external chucks and screw nuts (174). They can be changed automatically by the second work spindle. The screw nut (174) is used to fasten an unfinished workpiece on a prepared core shaft on the second work spindle.

FIG. 8 shows a mechanical embodiment of the gear shaping unit (94).

A shell (110) is supported in the rotatable multi-arbor box (32) by two linear bearings (125) (126) on both ends of the shell (110). On the opposite faces of the internal and the external rings (127) (128) of the bearings, there are rolling grooves parallel to each other, with rolling balls between them. In this manner, the gear shaping unit can slide gaplessly inside the rotatable multi-arbor box (32). The right half of the sliding rod (111) can slide and rotate in the sliding sleeve (114), and the left half is coupled with an index worm gear hub (122) through a ball spline (112). A spline sleeve (113) is fixed on the sliding rod (111) with a coaxial taper, and by adjusting the screw nut (115) and the sleeve (116) to swell spline sleeve, the gap of ball spline can be eliminated. The index worm screw (120) meshed with the index worm gear hub (122) is driven by an S axis servo motor (95). The rolling ring (117) is supported by ball (118) on the sliding rod (111) and forms a thrust bearing, and the swinging arm (134) can swing around a pivot (136) on one end, and has a pin (135) on other end inserted in the groove of the rolling ring (117). The gear shaft (130) is meshed with the power transmission system inside the rotatable multi-arbor box, and a shaft with an eccentric pin (131) is inserted in the eccentric hole of the gear shaft (130), while the pin of the shaft (131) is inserted in a slide block (133) that slides in the straight slot of the swinging arm (134). The shaft (131) is rotatable when the screw nut (132) loosened, so the stroke of the slide rod (111) can be adjusted. A clutch tooth is made on the back of the lower end disc of the shaft (131) and on the sunken surface of the gear shaft (130), so that shaft (131)can be fastened steadily. A small bearing (137) is on shell (110). A spring (139) forces the shell (110) up, and presses the bearing (137) to the cam on the lower end of gear shaft (130). When the gear shaft (130) rotates, the slide rod (11)starts its positive stroke, the cam pushes down shell (10) a regular distance (0.5–1.0 mm), and when the slide rod (111) starts its opposite stroke, the cam surface moves up, the spring (139) draws back the shell (110), so as to avoid the shaping tool contact with the during the opposite stroke. If a shaping tool held in other end of the sliding rod (111) is used, the gear shaft (130) must run in the opposite direction.

The simplest practical method of bevel gear planing is utilizing the index servo mechanism of the gear shaping unit, that is, attaching a bevel gear planning attachment on the gear shaping unit to machine the bevel gear.

As shown in FIG. 8, the bevel gear planning attachment comprises a swivel table (140); a left guide rail (145) and a right guide rail (146) mounted on the swivel table (140); left and right slide blocks (147), (148) slidably supported on the left and right guide rails respectively; left and right tool posts (149), (150) holding left and right planing tools (151), (152) fastened on the left and right slide blocks respectively; a center gear (141) which is meshed with racks made at the inner edge of the slide blocks (147) (148) and has one end supported by a bearing (142) on the center of swivel table (140), and other end twisted into a screw sleeve (143) with long pitch screw.

To the planing bevel gear, the swivel table (140) of the bevel gear planing attachment is mounted on the outer end of the worm gear hub (122) of the gear shaping unit, and the screw sleeve (143) is fastened in the taper hole of the slide rod (111).

When the slide rod (111) runs back and forth, the screw sleeve (143) forces the center gear (141) to rotate back and forth, and the gear (141), via the meshed racks, pushes the left and the right slide blocks (147), (148) and their planing tools (151), (152) to move back and forth, oppositely, so as to cut teeth.

When cutting a bevel gear, the movement of the gear shaping unit for avoiding contact between the tool and workpiece must be stopped. For this reason, a pushing rod is movably supported through a hole on the housing of the multi-arbor box (32) (not shown in the FIG.). When this rod is pushed, the inclined face of the pushing rod will push the shell (110) of the gear shaping unit down to leave the cam surface of the shaft (130), and to be fixed. This pushing rod can be operated manually by hand or pushed automatically by the work spindle.

The second practical method of bevel gear cutting employs a sharing swivel table. That sharing swivel table is rotatably supported on the rotatable multi-arbor box (32), and is driven to swing by a T axis index servo driver, and a power supply shaft coupled with the power transmission system inside the rotatable multi-arbor box (32) is supported in the center of the swivel table. A bevel gear planing attachment or a spiral bevel gear milling attachment can be attached to the sharing swivel table and obtains cutting power from the power supply shaft.

The third practical method of bevel gear cutting is making a sharing mounting surface outside the rotatable multi-arbor box, and a power supply shaft centering the mounting surface. A bevel gear planing unit or a spiral bevel gear milling unit (165) is attached to the mounting surface and obtain cutting power from the power supply shaft. Both the bevel gear planing unit and the spiral bevel gear milling unit have a T axis index servo driver for swivel table driving.

In the second and third methods, the cutter may also be driven by an independent power driver equipped in the attachments or units. The power driver may be electric, or hydraulic or pneumatic.

Figures 9A, 9B:
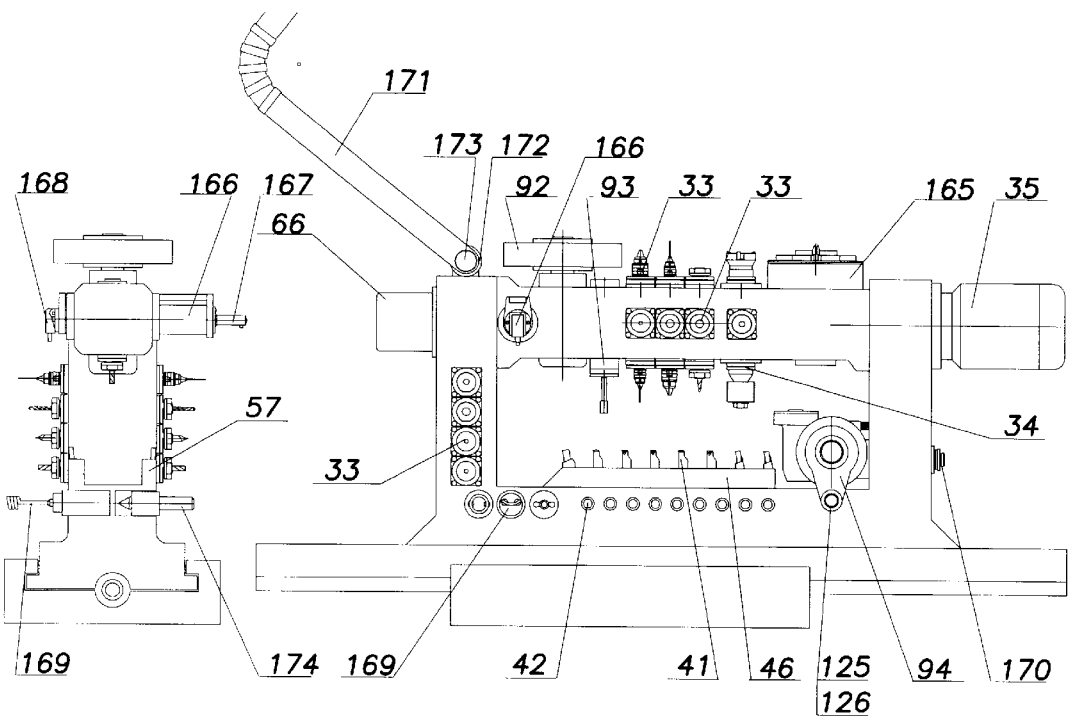
FIG. 9A shown a first alternate of the frame-shaped tool magazine shown in FIG. 7.
FIG. 9B is a cross-sectional view of the magazine shown in FIG. 9A.
Figures 10A, 10B:
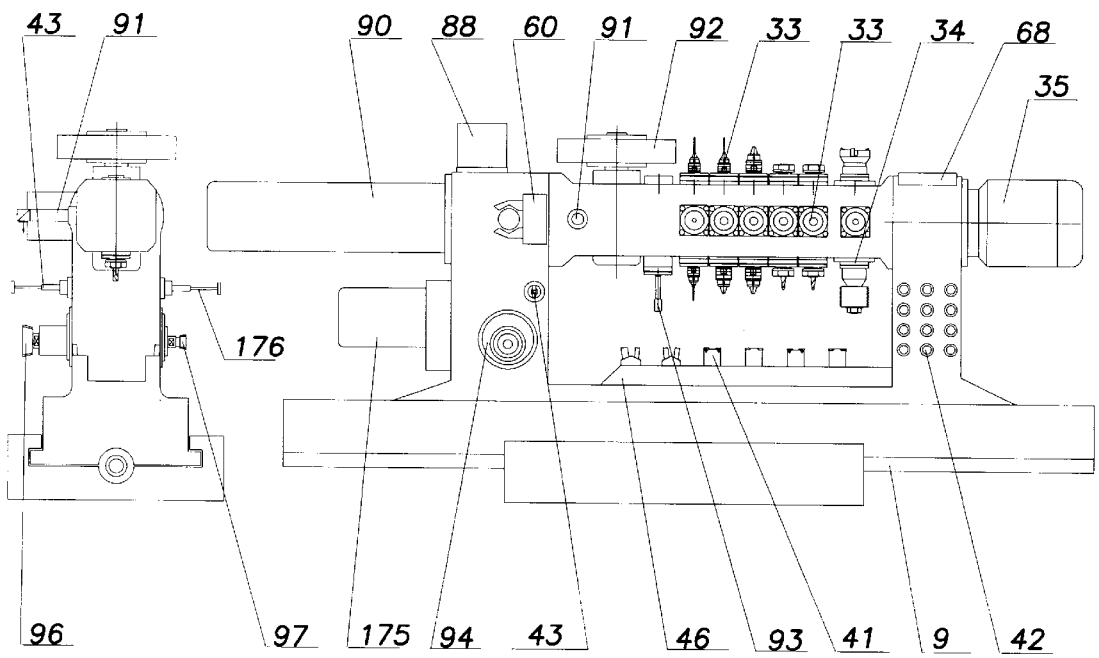
FIG. 10A shows a second alternate of the frame-shaped tool magazine shown in FIG.
FIG. 10B is a side cross-sectional view of the magazine shown in FIG. 10A.

FIG. 9 and FIG. 10 show two alternatives of the frame-shaped tool magazine shown in FIG. 7.

As shown in FIG. 9, the rotatable multi-arbor box is arranged in 4 rows of 4 driven arbors perpendicularly. A slotting unit (166) is mounted on the rotatable multi-arbor box and comprises a sliding rod passing through the slotting unit and a reciprocate mechanism driving the sliding rod to move reciprocally. Both ends of the sliding rod can hold tools, including a planing tool (168) held in a tool block attached to one end of the sliding rod. The tool block can rotate and be fastened at any angle. Using planing tools, planes or curved surfaces having arbitrary angles can be machined on the workpiece.

A slotting tool (167) is held in the other end of the sliding rod, and is used to slot internal cylindrical or taper surfaces, or to slot internal splines.

A bevel gear planing unit (165), or a spiral bevel gear milling unit, is also provided and their swivel table is driven by a T axis index servo driver, and cutting tools are driven by the transmission system inside the rotatable multi-arbor box.

A gear shaping unit (94) has its shell is supported by bearings (125) (126) inside the standing part of the frame-shaped tool magazine. The movement for avoiding contact between the tool and the workpiece in the opposite stroke is produced by swinging the gear shaping unit (94) about the axis of the bearings. A stroke adjuster (170) is provided for setting the cutter stroke length of the gear shaping unit.

A high frequency quenching coil (169) is provided.

A foldable blank feeder (171) has its upper end fixed, its outlet (173) at the lower end is mounted on the frame-shaped tool magazine, and a pusher (172) is at the back of the outlet (173) for pushing out the blank.

One row of oblique standing prism turning tools (41) are parallelly arranged on the standing part of the tool magazine.

As shown in FIG. 10, the rotatable multi-arbor box of the frame-shaped tool magazine includes 4 rows of 6 driven arbors, and a laser nozzle (91), but without a bevel gear cutting unit. The laser generator (90) is settled on the standing part of the frame-shaped tool magazine.

A gear shaping unit (94) is supported by bearings inside the standing part of the tool magazine so as to prevent the gear shaping unit from being polluted. The supporting bearings are eccentric to the sliding rod axis of the gear shaping unit, so that the movement for avoiding contact between the tool and the workpiece in the opposite stroke can be produced by swinging the gear shaping unit about the bearings. The movement of the cutter and the swinging of the gear shaping unit (94) are driven by motor (177).

The turning tools (41) are arranged in one row of "V"-like back to back prism tool pairs.

The above embodiment may further be changed to suit the different requirements of the industrial practice. For example, the frame-shaped tool magazine shown in FIG. 7 includes a plurality of driven arbors and a gear shaping unit on the rotatable multi-arbor box. By the aid of A axis control, all driven tools and two gear shaping tools can be moved to different positions and angles to machine the workpiece on two spindles, so each cutting tool can be fully utilized. If, on the other hand, the freedom of A axis will reduce the position accuracy of the tools, as for high precision machining, it is important to arrange the gear shaping unit and driven arbors parallel or perpendicular to the Z axis on the standing parts of the tool magazine, even employing two or more gear shaping units to complete internal and external gears or gears in different modules on one workpiece.

In order to arrange more tools and working units, a frame-shaped tool magazine shaped like "日", or "目" should be employed.

The frame-shaped tool magazine can be horizontal, or vertical, or oblique in the machine tool.

A long workpiece should be supported at the center, held in a tailstock, so it is reasonable for the frame-shaped tool magazine to slide on the bed along the Z axis.

Figures 11A, 11B:
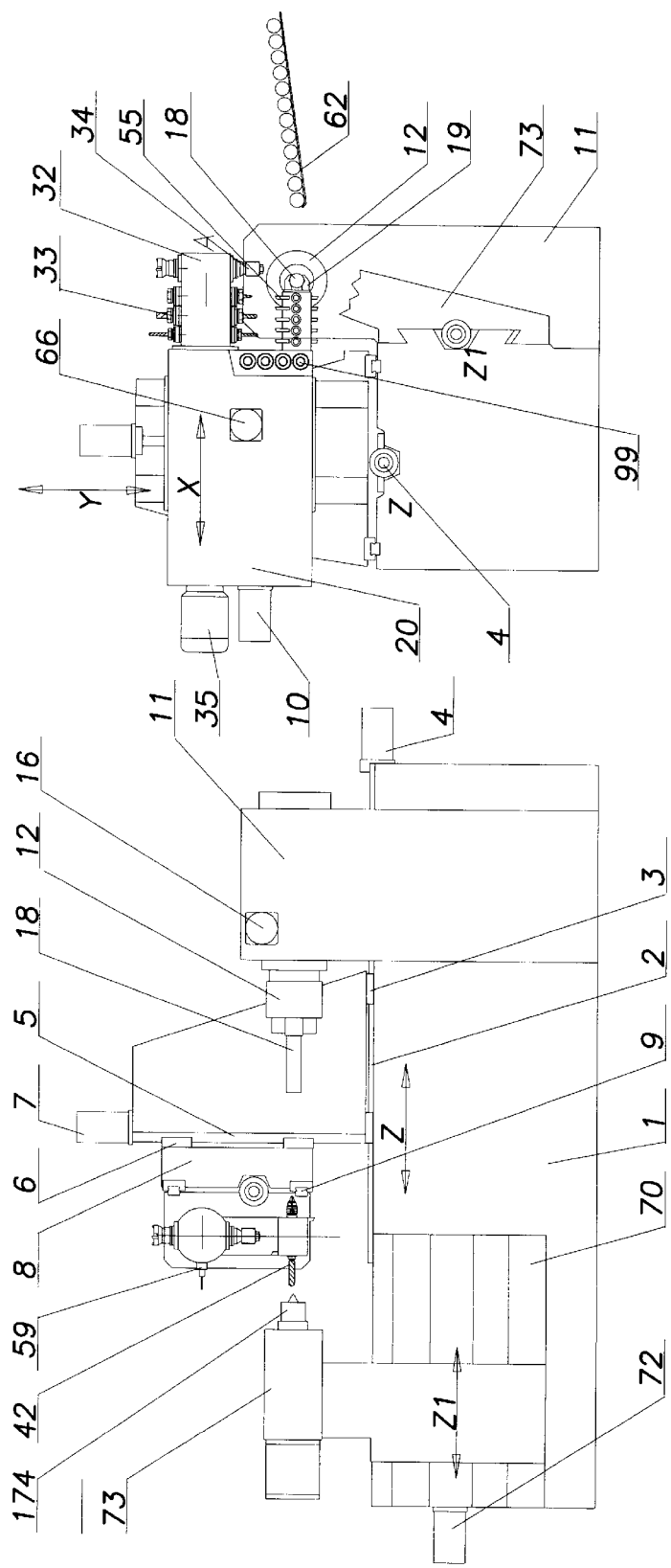
FIG. 11A is a front view of a turning milling center suitable for a long workpiece.
FIG. 11B is a side view of the turning milling center shown in FIG. 11A.

FIGS. 11A, 11B show the fifth embodiment, a turning milling center for a long workpiece.

As shown in the figures, the frame-shaped tool magazine (20) is supported by an X–Y cross slider (8) and a Y–Z slider (163) on the Z guide rail of the bed, so it is movable along the X, Y and Z axes. The headstock (11) is fixed on the bed, and a C axis servo driver (16) is provided for work spindle (12). The slider (163) is controlled by a Z axis servo driver to slide on the Z axis guide rail (2) on the bed, while the slider (163) has a vertical Y axis guide rail (5) perpendicular to the Z axis. The X–Y cross slider (8) is controlled by Y axis servo driver (7) to slide vertically on the Y guide rail (5) of the slider (163). The frame-shaped tool magazine (20) has a horizontal X axis guide rail (9) on the back side and can slide on the guide surface of the X–Y cross slider (8), and is controlled by X axis servo driver (10). The tailstock (73) can slide on the Z1 guide rail (70) of the bed, and is controlled by Z1 axis servo driver (72) to move and locate.

The frame-shaped tool magazine (20) is formed in a "U" shape for convenience of long workpiece loading. The rotatable multi-arbor box (32) includes 8 driven tools, including a hobber. If necessary, 16 driven tools can be held. All driven tools are driven by motor (35).

The rotatable multi-arbor box (32) is driven by an A axis servo driver (66). A fixture bank (99) for a work spindle is provided having one row of holes on the segment of the frame-shaped tool magazine, and can store centers, chucks and changeable fixtures for internal or external clamping, so that the work spindle can change fixtures or centers automatically during the machining process.

If the second end of the workpiece needs to be machined, the tailstock should be replaced by a second headstock and a second work spindle.

If the second end of the workpiece needs only turning, the C1 axis index servo driver can be eliminated.

Figures 12A, 12B:
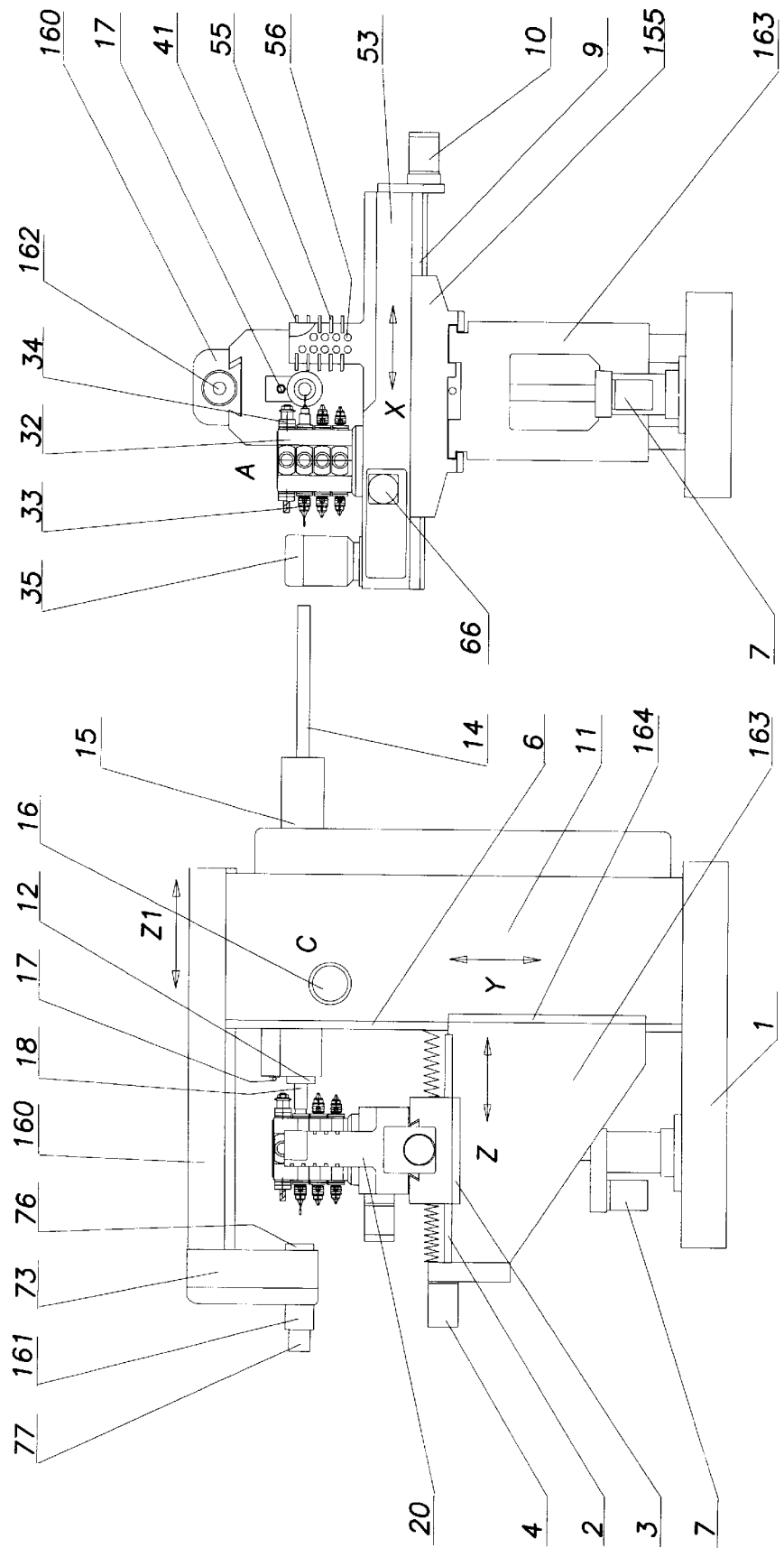
FIG. 12A is a side view of a double spindle turning milling center with a second work spindle attached to a ram.
FIG. 12B is a front view of the double work spindle turning milling center.

FIGS. 12A, 12B shows the sixth embodiment, a simple double spindle turning milling center.

As shown in FIG. 12, the headstock (11) and the bed are combined in one, and have a vertical Y axis guide rail (6) on the front, a Z-Y slider (163) has a vertical Y axis guide surface and a horizontal Z axis guide rail orthogonally, that can slide vertically on the Y axis guide rail of the bed, and is controlled by a Y axis servo driver (7) to move or locate. A cross slider (155) has a Z axis guide surface (3) on the bottom and a X axis guide surface on the top orthogonally, and can slide on the Z axis guide rail of the slider (163) and is controlled by a Z axis servo driver (4)to move or locate. A frame-shaped tool magazine (20) has an X axis guide rail on the bottom, and can slide on the X axis guide surface of the cross slider (155) and is controlled by an X axis servo driver (10) to move or locate. The headstock (11) has a Z1 guide surface parallel to the spindle axis and the Z guide rail on the top. A ram (160) is slidably supported on the Z1 guide surface, a second work spindle (76) is supported in a second headstock (73) attached to the front end of the ram, and the second work spindle may be rigidly transmitted from the main work spindle through gear chain and shafts, so as to save the C1 axis servo driver and the second main motor.

The ram can be driven by a Z1 axis servo driver to move or locate, or by a simple pushing mechanism, which either pushes the ram out to the machining position, or pulls the ram in to a position where the second work spindle can clamp the workpiece on the main work spindle.

C axis index servo driver (16) for the main work spindle, and a bar feeder (15) are provided.

In order to increase the rigidity of the second work spindle, the distance from the second work spindle axis to the bottom of the ram should be shortened, therefore the frame-shaped tool magazine (20) is formed in the shape of a "U". A rotatable multiarbor box (32) is on the left of the tool magazine (20), and includes 4 rows of 4 driven arbors perpendicularly, and is driven by an A axis servo driver (66). The driven arbors are driven by motor (35). The right segment of the tool magazine has vertically arranged thereon external turning tools and internal turning tools, the front external turning tools (41) are arranged 4 at the left, and 3 at the right, while the rear external turning tools (55) are arranged 4 at the left and 2 at the right. The internal turning tools are arranged 8 at the front and 6 at the rear.

A hydraulic cylinder (161) is provided for driving the chuck of the second work spindle, and a pushing cylinder (77) is provided for pushing the workpiece out the chuck.

Each embodiment mentioned above is suitable to relatively small workpieces, the blank generally being not larger than 100 mm in diameter and 200 mm in length. For larger workpiece machining, a composition of a frame-shaped tool magazine fixed and the headstock movable in the X, Y, Z direction is considerable.

All the above embodiments can perform automatic machining on both batch and single workpieces controlled by a computer.

For the convenience of single complex workpiece machining, a computer aided manual operation function should be added into the software.

The preferred embodiment is the multifunction machining center shown in FIG. 6.

The advantages of the present invention are:

1. Integrating the prior turning center, machining center, delivering robots, quenching machine, broaching, grinding machine, gear making machine etc. in one machine, is a single machine FMS.

2. Without an independent tool exchange mechanism, enough tools can be used to do different machining, and without an expensive loading robot, the blank loading and finished workpiece unloading can be completed automatically, and having small size, simple structure and low cost. Compared with an FMS which comprises several machining centers and machine tools, an FMS can machine different workpieces in different machining centers at the same time, while the present invention can only once do one machining sequentially. However, considering the troubles caused by the repeated loading, unloading, delivering, relocating and reclamping of a workpiece on different machine tools, the advantages of the present invention to multivariety small batch machining are obvious.

I claim:

1. A machine tool, comprising a bed, a first rotatable work spindle for holding a work piece, a C-axis servo driver to drive said work spindle at low speed, a first headstock supporting said work spindle, a tool magazine holding a plurality of cutting tools in rows, and guide pairs with feed servo drivers supporting and moving said tool magazine in the direction of an X-axis and a Y-axis, the X-axis and the Y-axis being oriented perpendicular to an axis of said work spindle and perpendicular to each other, said tool magazine further including:

a) a standing part having at least one row of axial fixed tools which are parallel to the work spindle axis and at least one row of radial fixed tools which are parallel to each other;

b) a rotatable part connected with the standing part via rotary surfaces, said rotatable part being rotatable about an A-axis parallel to the X-axis, and driveable arbors are arranged on the rotatable part perpendicular to said A-axis; and c) a fastening mechanism for locking said rotatable part relative to said standing part at an arbitrary angle.

2. The machine tool according to claim 1, wherein said tool magazine further comprises an A-axis servo driver for rotatably driving said rotatable part to the arbitrary angle.

3. The machine tool according to claim 1, wherein said tool magazine is composed of segments which connect with each other perpendicularly to form a frame having a shape consisting of one of an L, U, □, ⊟, and ☰.

4. The machine tool according to claim 1, further comprising an encoder coupled with at least one of said arbors on said tool magazine, and a control circuit synchronizing said work spindle with said one arbor.

5. The machine tool according to claim 1, wherein said tool magazine includes at least one bearing holder which is concentric with at least one of said arbors.

6. The machine tool according to claim 1, wherein said tool magazine further includes at least one of the following working units mounted thereon:

a) a loading and unloading gripper;

b) a laser nozzle;

c) a high frequency inducing quenching coil;

d) a fixture bank for storing changeable fixtures;

e) an outlet of a bank loader;

f) a slotting unit;

g) a gear shaping unit;

h) a sensor for work piece measuring;

i) a bevel gear cutting unit mounted on said rotatable part;

j) at least one row of driveable arbors arranged along the A-axis on said rotatable part;

k) at least one row of driveable arbors which are parallel to the work spindle axis and arranged on said standing part along an axis perpendicular to the work spindle axis; and l) at least one row of driveable arbors which are perpendicular to the work spindle axis and arranged on said standing part along an axis perpendicular to the work spindle axis.

7. The machine tool according to claim 1, further comprising a second work spindle concentric with the first work spindle and a second headstock which supports said second work spindle, said second headstock being located opposite the first headstock on the other side of said tool magazine and supported on one of the following:

a) a guide pair slidable on said bed in the direction of the first work spindle axis, b) the front end of a ram which is supported on the top of said first headstock and slidable in the direction of the first work spindle axis.

8. The machine tool according to claim 1, wherein said first headstock is equipped with at least one of the following tools:

a) a cutting tool measuring sensor, b) a grinding wheel dresser.

9. The machine tool according to claim 1, further comprising a broaching unit and a broach cycle mechanism attached to said bed.

10. The machine tool according to claim 6, wherein the tool magazine includes the gear shaping unit, and the gear shaping unit includes a slide rod having opposite ends capable of holding shaping tools.

11. The machine tool according to claim 10, wherein the gear shaping unit further includes a shell, the shell being supported by two bearings on an axis that is eccentric to the axis of the slide rod.

12. The machine tool according to claim 6, wherein the tool magazine includes the bevel gear cutting unit, said bevel gear cutting unit comprises a swivel table supported on the rotatable part of said tool magazine; a T-axis index servo driver driving said swivel table; first and second slide blocks holding first and second planing tools, said first and second slide blocks movably supported by first and second guide rails on said swivel table; a reciprocate mechanism receiving power from a transmission system inside said tool magazine and driving said first and second slide blocks reciprocally and oppositely.

13. The machine tool according to claim 12, wherein said bevel gear cutting unit is composed of said gear shaping unit and a bevel gear planing attachment which includes the swivel table, said swivel table is attached to the index worm gear hub of said gear shaping unit.

14. The machine tool according to claim 6, wherein the tool magazine includes the loading and unloading gripper, and said loading and unloading gripper is mounted on a rotating mechanism.

15. The machine tool according to claim 14, wherein said loading and unloading gripper comprises at least two pairs of jaws which move oppositely, syncro-meshly and symmetrically, and each pair of jaws are driven respectively by a power source.

16. The machine tool according to claim 6, wherein said one row of driveable arbors is arranged so that the distance between adjacent arbors is $S1=D+d+\delta 1$, wherein D is the maximum diameter of the workpiece, d is an average diameter of two adjacent arbors, $\delta 1$ is a sum of gaps between the workpiece and two adjacent arbors when the workpiece is between the two arbors.

* * * * *